US012263841B2

(12) United States Patent
Kato et al.

(10) Patent No.: US 12,263,841 B2
(45) Date of Patent: Apr. 1, 2025

(54) DRIVING SUPPORT DEVICE, VEHICLE, DRIVING SUPPORT METHOD, AND STORAGE MEDIUM

(71) Applicant: HONDA MOTOR CO., LTD., Tokyo (JP)

(72) Inventors: Daichi Kato, Wako (JP); Haruhiko Nishiguchi, Wako (JP); Shingo Ito, Wako (JP); Yuma Yoshida, Wako (JP); Ayumu Horiba, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 178 days.

(21) Appl. No.: 18/111,871

(22) Filed: Feb. 20, 2023

(65) Prior Publication Data
US 2023/0303078 A1 Sep. 28, 2023

(30) Foreign Application Priority Data

Mar. 25, 2022 (JP) ................................ 2022-050378

(51) Int. Cl.
*B60W 30/18* (2012.01)
*B60W 40/08* (2012.01)
(Continued)

(52) U.S. Cl.
CPC ...... *B60W 30/18163* (2013.01); *B60W 40/08* (2013.01); *B60W 50/14* (2013.01); *G06V 20/59* (2022.01); *B60W 2420/403* (2013.01)

(58) Field of Classification Search
CPC .......... B60W 30/18163; B60W 40/08; B60W 50/14; B60W 2050/146; B60W 2420/403; B60W 2540/215; B60W 2540/223; B60W 2540/225; B60W 2556/40; B60W 60/0015; G06V 20/59
(Continued)

(56) References Cited

U.S. PATENT DOCUMENTS 11,396,296 B2    7/2022  Tsuji et al.
11,584,375 B2 *  2/2023  Kato ............... B60W 30/18163
(Continued)

FOREIGN PATENT DOCUMENTS

JP    2020114699 A    7/2020
JP    2020-163907 A   10/2020

OTHER PUBLICATIONS

Japanese Office Action for Japanese Patent Application No. 2022-050378 mailed Oct. 10, 2023.

*Primary Examiner* — Hai H Huynh
(74) *Attorney, Agent, or Firm* — Thomas | Horstemeyer, LLP

(57) ABSTRACT

The present invention provides a driving support device that performs driving support of a vehicle, comprising: a detector configured to detect a state of a driver of the vehicle; and a controller configured to control the driving support with a setting validated by the driver among a plurality of settings including a first setting and a second setting each of which requests the driver to perform a predetermined operation obligation, wherein the controller is configured to invalidate the second setting, in a case of determining that the driver does not fulfill the operation obligation from a detection result of the detector in a state where the second setting is validated.

22 Claims, 8 Drawing Sheets

(51) Int. Cl.
*B60W 50/14* (2020.01)
*G06V 20/59* (2022.01)
(58) Field of Classification Search
USPC .......................................... 701/41, 42, 43, 44
See application file for complete search history.

(56) References Cited

U.S. PATENT DOCUMENTS

| 11,702,095 B2* | 7/2023 | Tsugawa | B60W 40/08 |
| | | | 340/438 |
| 2020/0231159 A1 | 7/2020 | Tsuji et al. | |
| 2020/0307595 A1 | 10/2020 | Kato et al. | |

* cited by examiner

FIG. 2

|  | MANUAL DRIVING MODE | NORMAL SUPPORT MODE | EXTENSION SUPPORT MODE |
|---|---|---|---|
| ACC | ✕ | ◯ | ◯ (with map) |
| ACC + LKAS | ✕ | ◯ | ◯ (with map) |
| ALC | ✕ | ✕ | ◯ (with map) |
| ALCA | ✕ | ✕ | ◯ (with map) |

DRIVING SUPPORT DEVICE, VEHICLE, DRIVING SUPPORT METHOD, AND STORAGE MEDIUM

CROSS-REFERENCE TO RELATED APPLICATION(S)

This application claims priority to and the benefit of Japanese Patent Application No. 2022-050378 filed on Mar. 25, 2022, the entire disclosure of which is incorporated herein by reference.

BACKGROUND OF THE INVENTION

Field of the Invention

The present invention relates to a technique of controlling a vehicle.

Description of the Related Art

Japanese Patent Laid-Open No. 2020-163907 discloses a vehicle control device that switches an automated driving mode of a vehicle between a first mode in which auto lane changing for changing a course of the vehicle is prohibited by controlling steering and speed of the vehicle and a second mode in which the auto lane changing is permitted according to an input operation of a driver.

In automated driving of a vehicle, a predetermined operation obligation such as a steering wheel gripping obligation and a periphery monitoring obligation may be imposed on a driver. In a case where the driver does not fulfill such an operation obligation, it is desirable to limit driving support (for example, auto lane changing) for a lane change from the viewpoint of safety.

SUMMARY OF THE INVENTION

The present invention provides, for example, a technology capable of improving safety of a vehicle by appropriately performing driving support for a lane change.

According to one aspect of the present invention, there is provided a driving support device that performs driving support of a vehicle, the driving support device comprising: a detector configured to detect a state of a driver of the vehicle; and a controller configured to control the driving support with a setting validated by the driver among a plurality of settings including a first setting and a second setting each of which requests the driver to perform a predetermined operation obligation, wherein the first setting is a setting in which first driving support for supporting traveling of the vehicle in a traveling lane in which the vehicle travels is provided, wherein the second setting is a setting in which second driving support for supporting a lane change of the vehicle from the traveling lane to an adjacent lane is provided, and is validated in a state where the first setting is validated, and wherein the controller is configured to invalidate the second setting, in a case of determining that the driver does not fulfill the operation obligation from a detection result of the detector in a state where the second setting is validated.

Further features of the present invention will become apparent from the following description of exemplary embodiments with reference to the attached drawings.

BRIEF DESCRIPTION OF THE DRAWINGS

FIG. 2 is a diagram illustrating driving support executed in each mode;

DESCRIPTION OF THE EMBODIMENTS

Figure 1:
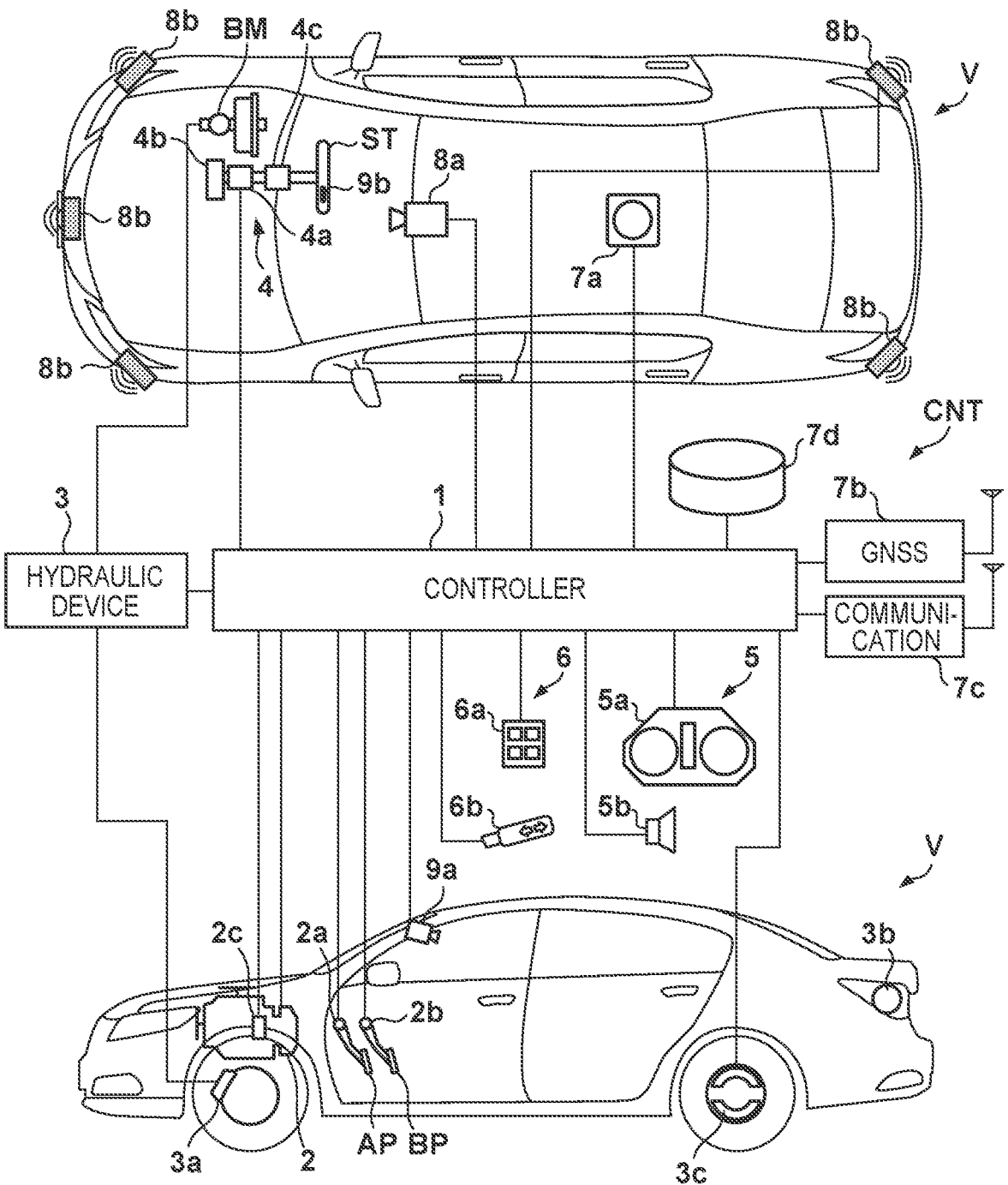
FIG. 1 is a block diagram of a vehicle and a control device thereof.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

An embodiment according to the present invention will be described. FIG. 1 is a block diagram of a vehicle V and a control device CNT thereof according to the present embodiment. In FIG. 1, an outline of a vehicle V is illustrated by a plan view and a side view. The vehicle V of the present embodiment is, for example, a sedan-type four-wheel passenger vehicle, and may be, for example, a parallel hybrid vehicle. Note that the vehicle V is not limited to the four-wheeled passenger vehicle, and may be a straddle type vehicle (motorcycle or three-wheeled vehicle) or a large vehicle such as a truck or a bus.

[Configuration of Vehicle Control Device]

The control device CNT includes a controller 1 that is an electronic circuit that executes control of the vehicle V including driving support of the vehicle V. The controller 1 includes a plurality of electronic control units (ECUs). The ECU is provided for each function of the control device CNT, for example. Each ECU includes a processor represented by a central processing unit (CPU), a storage device such as a semiconductor memory, an interface with an external device, and the like. The storage device stores a program executed by the processor, data used for processing by the processor, and the like. The interface includes an input/output interface and a communication interface. Each ECU may include a plurality of processors, a plurality of storage devices, and a plurality of interfaces.

The controller 1 controls driving (acceleration) of the vehicle V by controlling a power unit (power plant) 2. The power unit 2 is a travel driving unit that outputs driving force for rotating driving wheels of the vehicle V, and can include an internal combustion engine, a motor, and an automatic transmission. The motor can be used as a drive source for accelerating the vehicle V, and can also be used as a generator at the time of deceleration or the like (regenerative braking).

In the case of the present embodiment, the controller 1 controls the output of the internal combustion engine or the motor or switches a gear ratio of the automatic transmission in accordance with a driving operation of the driver or a vehicle speed detected by an operation detection sensor 2a provided on an accelerator pedal AP or an operation detection sensor 2*b* provided on a brake pedal BP. Note that the automatic transmission is provided with a rotation speed sensor 2*c* that detects a rotation speed of an output shaft of the automatic transmission as a sensor that detects a traveling state of the vehicle V. The vehicle speed of the vehicle V can be calculated from a detection result of the rotation speed sensor 2*c*.

The controller 1 controls braking (deceleration) of the vehicle V by controlling a hydraulic device 3. A braking operation of the driver on the brake pedal BP is converted into hydraulic pressure in a brake master cylinder BM and transmitted to the hydraulic device 3. The hydraulic device 3 is an actuator capable of controlling the hydraulic pressure of the hydraulic oil supplied to a brake device 3*a* (for example, a disc brake device) provided on each of the four wheels based on the hydraulic pressure transmitted from the brake master cylinder BM.

The controller 1 can control braking of the vehicle V by performing drive control of an electromagnetic valve or the like included in the hydraulic device 3. The controller 1 can also configure an electric servo brake system by controlling the distribution of a braking force by the brake device 3*a* and a braking force by regenerative braking of the motor included in the power unit 2. The controller 1 may turn on a brake lamp 3*b* at the time of braking.

The controller 1 controls steering of the vehicle V by controlling an electric power steering device 4. The electric power steering device 4 includes a mechanism that steers a front wheel according to the driving operation (steering operation) of the driver on a steering wheel ST. The electric power steering device 4 includes a drive unit 4*a* including a motor that exerts a driving force (sometimes referred to as a steering assist torque) for supporting steering operation or automatically steering the front wheel, a steering angle sensor 4*b*, a torque sensor 4*c* that detects steering torque (called steering load torque and distinguished from steering assist torque) borne by the driver, and the like.

The controller 1 controls an electric parking brake device 3*c* provided on a rear wheel. The electric parking brake device 3*c* includes a mechanism for locking the rear wheel. The controller 1 can control locking and unlocking of the rear wheel by the electric parking brake device 3*c*.

The controller 1 controls an information output device 5 that notifies information to the inside of the vehicle. The information output device 5 includes, for example, a display device 5*a* that notifies the driver of information by an image and/or a voice output device 5*b* that notifies the driver of information by a voice. The display device 5*a* can be provided on, for example, an instrument panel or a steering wheel ST. The display device 5*a* may be a head-up display. The information output device 5 may notify an occupant of information by vibration or light.

The controller 1 receives an instruction input from the occupant (for example, driver) via an input device 6. The input device 6 is disposed at a position operable by the driver, and includes, for example, a switch group 6*a* for the driver to instruct vehicle V and/or a direction indicator lever 6*b* for operating a direction indicator (direction indicator).

The controller 1 recognizes and determines a current position and a course (attitude) of the vehicle V. In the case of the present embodiment, the vehicle V is provided with a gyro sensor 7*a*, a global navigation satellite system (GNSS) sensor 7*b*, and a communication device 7*c*. The gyro sensor 7*a* detects rotational motion (yaw rate) of the vehicle V. The GNSS sensor 7*b* detects the current position of the vehicle V. In addition, the communication device 7*c* performs wireless communication with a server that provides map information and traffic information, and acquires these pieces of information. In the case of the present embodiment, the controller 1 determines the course of the vehicle V based on the detection results of the gyro sensor 7*a* and the GNSS sensor 7*b*, sequentially acquires highly accurate map (high-definition map) information regarding the course from the server via the communication device 7*c*, and stores the map information in a database 7*d* (storage device). Note that the vehicle V may be provided with a sensor for detecting the state of the vehicle V, such as a speed sensor for detecting the speed of the vehicle V or an acceleration sensor for detecting the acceleration of the vehicle V.

The controller 1 executes driving support of the vehicle V based on detection results of various detection units provided in the vehicle V. The vehicle V is provided with surroundings detection units 8*a* and 8*b*, which are external sensors that detect the outside (surrounding situation) of the vehicle V, and in-vehicle detection units 9*a* and 9*b*, which are in-vehicle sensors that detect the situation inside the vehicle (the state of the driver). The controller 1 can grasp the surrounding situation of the vehicle V based on the detection results of the surroundings detection units 8*a* and 8*b*, and execute the driving support according to the surrounding situation. In addition, the controller 1 can determine whether the driver is fulfilling a predetermined operation obligation imposed on the driver when executing the driving support based on the detection results of the in-vehicle detection units 9*a* and 9*b*.

The surroundings detection unit 8*a* is an imaging device (hereinafter, may be referred to as a front camera 8*a*) that captures an image of the front of the vehicle V, and is attached to a vehicle interior side of a windshield at the front of a roof of the vehicle V, for example. The controller 1 can extract a contour of a target or a lane division line (such as a white line) on a road by analyzing an image captured by the front camera 8*a*.

The surroundings detection unit 8*b* is a millimeter wave radar (hereinafter, may be referred to as a radar 8*b*), detects a target around the vehicle V using radio waves, and detects (measures) a distance to the target and a direction (azimuth) of the target with respect to the vehicle V. In the example illustrated in FIG. 1, five radars 8*b* are provided, one at the center of the front portion of the vehicle V, one at each of the left and right corner portions of the front portion, and one at each of the left and right corner portions of the rear portion.

Note that the surroundings detection unit provided in the vehicle V is not limited to the above configuration, and the number of cameras and the number of radars may be changed, or a light detection and ranging (LiDAR) for detecting a target around the vehicle V may be provided.

The in-vehicle detection unit 9*a* is an imaging device (hereinafter, may be referred to as an in-vehicle camera 9*a*) that captures an image of the inside of the vehicle, and is attached to, for example, the vehicle interior side at the front of the roof of the vehicle V. In the case of the present embodiment, the in-vehicle camera 9*a* is a driver monitor camera that captures an image of a driver (for example, eyes and a face of the driver). The controller 1 can determine the direction of the line of sight and the face of the driver by analyzing an image (a face image of the driver) captured by the in-vehicle camera 9*a*.

The in-vehicle detection unit 9*b* is a grip sensor (hereinafter, may be referred to as a grip sensor 9*b*) that detects grip of the steering wheel ST by the driver, and is provided in at least a part of the steering wheel ST, for example. As the in-vehicle detection unit, the torque sensor 4*c* that detects the steering torque of the driver may be used.

Examples of the driving support of the vehicle V include acceleration/deceleration support, lane keeping support, and lane change support. The acceleration/deceleration support is driving support (adaptive cruise control (ACC)) that controls acceleration/deceleration of the vehicle V within a predetermined vehicle speed while maintaining an inter-vehicle distance from a preceding vehicle by controlling the power unit 2 and the hydraulic device 3. The lane keeping support is driving support (lane keeping assist system (LKAS)) that controls the electric power steering device 4 to keep the vehicle V inside the lane. The lane change support is driving support (ALC: Auto Lane Changing, ALCA: Active Lane Change Assist) for changing a traveling lane of the vehicle V to the adjacent lane by controlling the electric power steering device 4. In addition, the driving support executed by the controller 1 may include a collision reduction brake, an ABS function, traction control, and/or attitude control of the vehicle V for supporting collision avoidance with a target (for example, a pedestrian, another vehicle, or an obstacle) on the road by controlling the hydraulic device 3.

The driving support (acceleration/deceleration support, lane keeping support, lane change support) of the vehicle V is executed in a plurality of driving modes including a manual driving mode, a normal support mode, and an extension support mode. FIG. 2 illustrates driving support executed in each of the manual driving mode, the normal support mode, and the extension support mode of the present embodiment. In the manual driving mode, acceleration/deceleration support, lane keeping support, and lane change support are not executed, and manual driving of the vehicle V is performed by the driver.

In the manual driving mode, when an instruction to set the acceleration/deceleration support (ACC) is input by the driver via the input device 6 (for example, the switch group 6a), the acceleration/deceleration support is started, and the mode is shifted from the manual driving mode to the normal support mode. In the normal support mode, the lane keeping support (LKAS) can be executed in addition to the acceleration/deceleration support. The lane keeping support is started when an instruction input for setting the lane keeping support is made by the driver via the input device 6 (for example, the switch group 6a) during the setting of the acceleration/deceleration support. The acceleration/deceleration support and the lane keeping support are terminated when an instruction to cancel the setting is input by the driver via the input device 6 (for example, the switch group 6a).

In the normal support mode, the driver is required to fulfill predetermined operation obligation such as periphery monitoring and steering wheel gripping. When it is determined that the driver does not fulfill the predetermined operation obligation based on the detection result of the in-vehicle detection unit 9b, a notification for prompting the driver to fulfill the predetermined operation obligation is performed via the information output device 5.

When traveling on a specific road is started during execution of the normal support mode, highly accurate map information is acquired by the communication device 7c. Then, when matching between the highly accurate map information and the image captured by the front camera 8a is successful, the normal support mode is automatically shifted to the extension support mode. The specific road is a road that provides highly accurate map information, and examples thereof include an expressway and an automobile exclusive road. The highly accurate map information includes, in addition to normal information such as a route and a position of a specific road, information related to a detailed shape of the specific road such as presence or absence of a curve, a curvature, an increase or decrease in the number of lanes, and a gradient in the specific road. When the mode shifts from the normal support mode to the extension support mode, the information output device 5 notifies that the mode has shifted to the extension support mode, for example, by changing the light emission color of the display device 5a provided on the steering wheel ST.

In the extension support mode, the acceleration/deceleration support (and lane keeping support) in cooperation with highly accurate map information is performed. For example, based on highly accurate map information, the controller 1 can perform acceleration/deceleration support more advanced than the normal support mode, such as decelerating the vehicle V before a curve or before a point where a lane decreases, or adjusting the speed of the vehicle V according to the curvature of the curve. Similarly to the normal support mode, the extension support mode also imposes a predetermined operation obligation on the driver, such as periphery monitoring and steering wheel gripping. When it is determined that the driver does not fulfill the predetermined operation obligation based on the detection result of the in-vehicle detection unit 9b, a notification for prompting the driver to fulfill the predetermined operation obligation is performed via the information output device 5.

In addition, in the extension support mode, lane change support can be further executed. In the case of the present embodiment, the lane change support includes system-initiated lane change support (Auto Lane Changing (ALC)) that automatically changes the lane based on the determination of the controller 1, and driver-initiated lane change support (Active Lane Change Assist (ALCA)) that automatically changes the lane based on an instruction input from the driver. Note that, in both the system-initiated lane change support (ALC) and the driver-initiated lane change support (ALCA), when performing the lane change support, the driver is required to fulfill predetermined operation obligations such as periphery monitoring and steering wheel gripping.

The system-initiated lane change support (ALC) is started when an instruction input for setting the ALC in the extension support mode is performed by the driver via the input device 6 (for example, the switch group 6a). During the ALC setting, the controller 1 sequentially determines whether it is necessary to execute a lane change in order to arrive at a destination set in advance by the driver based on highly accurate map information (information such as lane increase/decrease or branching of a lane), and automatically performs the lane change when determining that it is necessary to execute the lane change. During the ALC setting, one or more lane changes can be executed according to the determination of the controller 1. The ALC ends when the vehicle arrives at the destination or when the specific road ends. The ALC may be ended in a case where an instruction input to cancel the setting is performed by the driver via the input device 6 (for example, the switch group 6a).

The driver-initiated lane change support (ALCA) is to perform one lane change in response to an instruction input by the driver, and is executed when the instruction input for instructing execution of ALCA in the extension support mode is performed by the driver via the input device 6 (for example, the direction indicator lever 6b). In the ALCA, the driver can perform an instruction input of a direction for requesting a lane change via the input device 6 (direction indicator lever 6b), and the controller 1 automatically performs a lane change to an adjacent lane in the direction in which the instruction is input by the driver. In the present embodiment, the ALCA can be executed based on highly accurate map information, but is not limited thereto, and may be executed without using highly accurate map information. The ALCA can also be executed during the setting of the system-initiated lane change support (ALC).

[Configuration of Driving Support Device]

Figure 3:
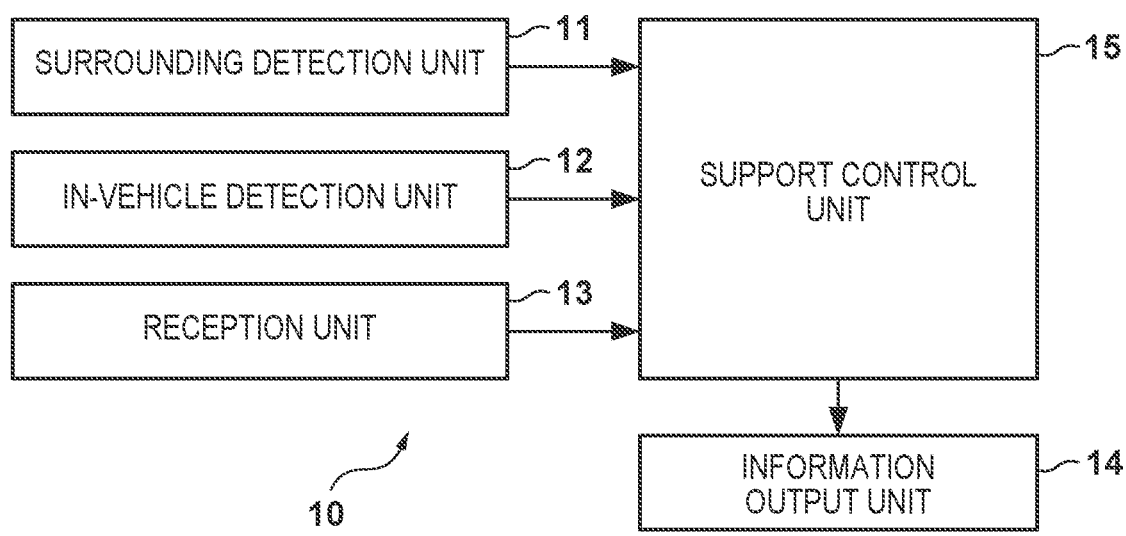
FIG. 3 is a block diagram illustrating a configuration example of a driving support device.

Hereinafter, a configuration example of the driving support device 10 of the present embodiment will be described with reference to FIG. 3. FIG. 3 is a block diagram illustrating a configuration example of the driving support device 10, and is obtained by extracting a configuration and a function particularly related to the present invention from the control device CNT described above. The driving support device 10 of the present embodiment is a device that performs driving support of the vehicle V with a setting according to an instruction input of the driver among a plurality of settings, and can include, for example, a surroundings detection unit 11 (surroundings detector), an in-vehicle detection unit 12 (in-vehicle detector), a reception unit 13, an information output unit 14, and a support control unit 15 (support controller). The surroundings detection unit 11, the in-vehicle detection unit 12, the reception unit 13, the information output unit 14, and the support control unit 15 are communicably connected to each other via a system bus.

The surroundings detection unit 11 is the front camera 8a and radar 8b illustrated in FIG. 1, and detects the surrounding situation of the vehicle V. In the case of the present embodiment, the surroundings detection unit 11 can also detect a target (for example, an obstacle, another vehicle, or a pedestrian) around the vehicle V and measure the distance to the detected target and the position/direction of the target with respect to the vehicle V.

The in-vehicle detection unit 12 is the in-vehicle camera 9a and the grip sensor 9b illustrated in FIG. 1, and detects the state of the driver of the vehicle V In the case of the present embodiment, the in-vehicle detection unit 12 can detect the line of sight and the direction of the face of the driver by photographing the driver (for example, the eyes and the face of the driver) by the in-vehicle camera 9a and analyzing the image obtained by the photographing. In addition, the in-vehicle detection unit 12 can detect the grip state (that is, whether the steering wheel ST is gripped) of the steering wheel ST of the driver by the grip sensor 9b.

The reception unit 13 is the input device 6 (switch group 6a, direction indicator lever 6b) illustrated in FIG. 1, and receives the instruction input from the driver. In the case of the present embodiment, the switch group 6a as the reception unit 13 is provided in the steering wheel ST, and can receive an instruction input for instructing validation (on, start)/invalidation (off, end) of various driving support settings from the driver. In addition, the direction indicator lever 6b as the reception unit 13 can receive an instruction input for instructing the driver-initiated lane change support (ALCA) from the driver. The direction indicator lever 6b can also receive an instruction input in a direction (right direction or left direction) in which the driver requests lane change support.

The information output unit 14 is the information output device 5 (display device 5a and voice output device 5b) illustrated in FIG. 1, and notifies the driver of the state of the driving support mode, the state of driving support setting, and the like. In the present embodiment, the information output unit 14 is provided on the instrument panel and the steering wheel ST. The information output unit 14 provided on the instrument panel is, for example, a display, and is configured to notify (display) a setting state of driving support and a request for an operation obligation to the driver. The information output unit 14 provided in the steering wheel ST is, for example, a lamp, and is configured to notify whether the current driving mode is the normal support mode or the extension support mode. As an example, when the current driving mode is the normal support mode, the lamp provided on the steering wheel ST is turned off as the information output unit 14, and when the current driving mode is the extension support mode, the lamp is turned on.

The support control unit 15 is constituted by a computer including a processor represented by a central processing unit (CPU), a storage device such as a semiconductor memory, an interface with an external device, and the like, and functions as a part of the controller 1 (ECU) illustrated in FIG. 1. The storage device stores a program (driving support program) for performing the driving support of the vehicle V, and the support control unit 15 can read and execute the driving support program stored in the storage device.

The support control unit 15 determines whether the driver has fulfilled a predetermined operation obligation imposed on the driver in various types of driving support based on the detection result of the in-vehicle detection unit 12. In the case of the present embodiment, the predetermined operation obligation is required in the normal support mode and the extension support mode (that is, first setting and second setting), and may include the periphery monitoring obligation and the steering wheel gripping obligation. The periphery monitoring obligation imposes monitoring (confirmation) of the periphery of the vehicle V on the driver. For example, while the acceleration/deceleration support (and the lane keeping support) is being executed, the driver is required to monitor the front of the vehicle V, and when the lane change support is executed, the driver is required to monitor of the direction in which the lane change is performed. The support control unit 15 can determine whether the driver fulfills the periphery monitoring obligation based on the image captured by the in-vehicle camera 9a as the in-vehicle detection unit 12. In addition, the steering wheel gripping obligation requires the driver to grip the steering wheel ST. The support control unit 15 can determine whether the driver fulfills the steering wheel gripping obligation based on the detection result of the grip sensor 9b as the in-vehicle detection unit 12.

Further, the support control unit 15 controls various kinds of driving support based on the detection result of the surroundings detection unit 11. In the case of the present embodiment, the support control unit 15 controls the driving support with a setting turned on (validated) by an instruction input from the driver received by the reception unit 13 among a plurality of settings including the first setting and the second setting that require a predetermined operation obligation (periphery monitoring obligation and steering wheel gripping obligation).

The first setting is a setting in which a first driving support for supporting the travel of the vehicle V in the traveling lane in which the vehicle V is traveling is provided. The first setting can be turned on (validated) in response to reception of the first instruction input by the reception unit 13 (switch group 6a). The first driving support provided in the first setting is, for example, the acceleration/deceleration support (ACC), and may further include the lane keeping support (LKAS).

The second setting is a setting in which a second driving support (auto lane changing) for supporting the lane change of the vehicle V from the traveling lane to the adjacent lane is provided. The second setting can be turned on (validated) in response to reception of the second instruction input by the reception unit 13 (switch group 6*a*) in a state where the first setting is turned on (validated). The second driving support provided in the second setting is, for example, the system-initiated lane change support (ALC). Then, the second instruction input is performed by an operation different from the first instruction input, and can be performed, for example, by pressing a switch (button) different from a switch (button) for performing the first instruction input.

Further, the support control unit 15 may control one second driving support (auto lane changing) in response to reception of a third instruction input by the reception unit 13 in the extension support mode. The second driving support in this case is the driver-initiated lane change support (ALCA). Then, the third instruction input is performed by an operation different from the first instruction input and/or the second instruction input, and can be performed, for example, by an operation of the direction indicator lever 6*b* as the reception unit 13. That is, when the direction in which the driver requests the lane change support is received as the third instruction input by the reception unit 13 (direction indicator lever 6*b*), the support control unit 15 can control the second driving support (ALCA) to change the lane to the adjacent lane in the direction. Here, when it is determined that it is necessary to execute the lane change in order to arrive at the destination set in advance by the driver in a state where the second setting is turned on (validated), the support control unit 15 can execute one or more times of the second driving support (auto lane changing, ALC) even without the third instruction input.

[Driving Support Processing]

Figure 4:
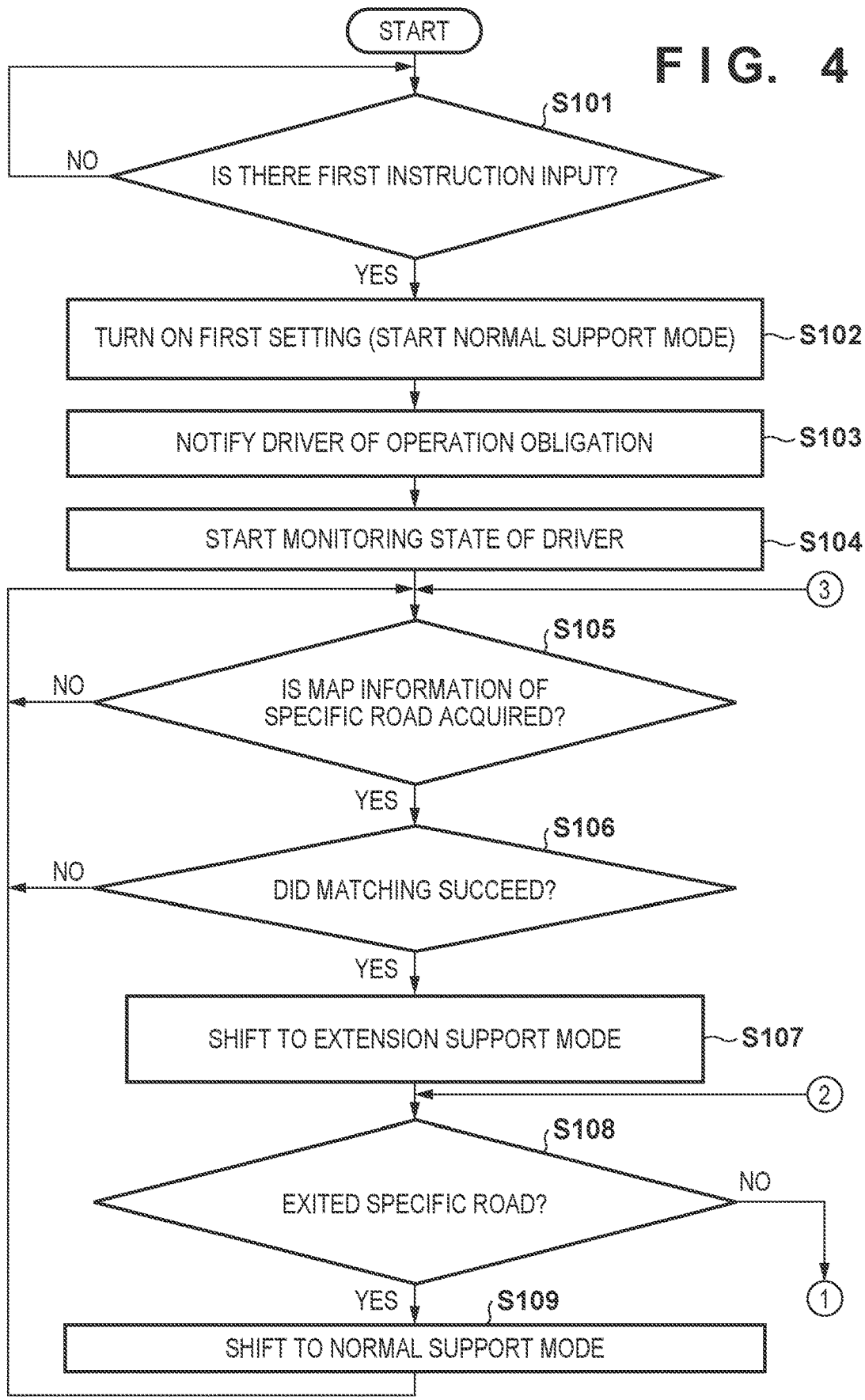
FIG. 4 is a flowchart illustrating driving support processing.
Figure 5A:
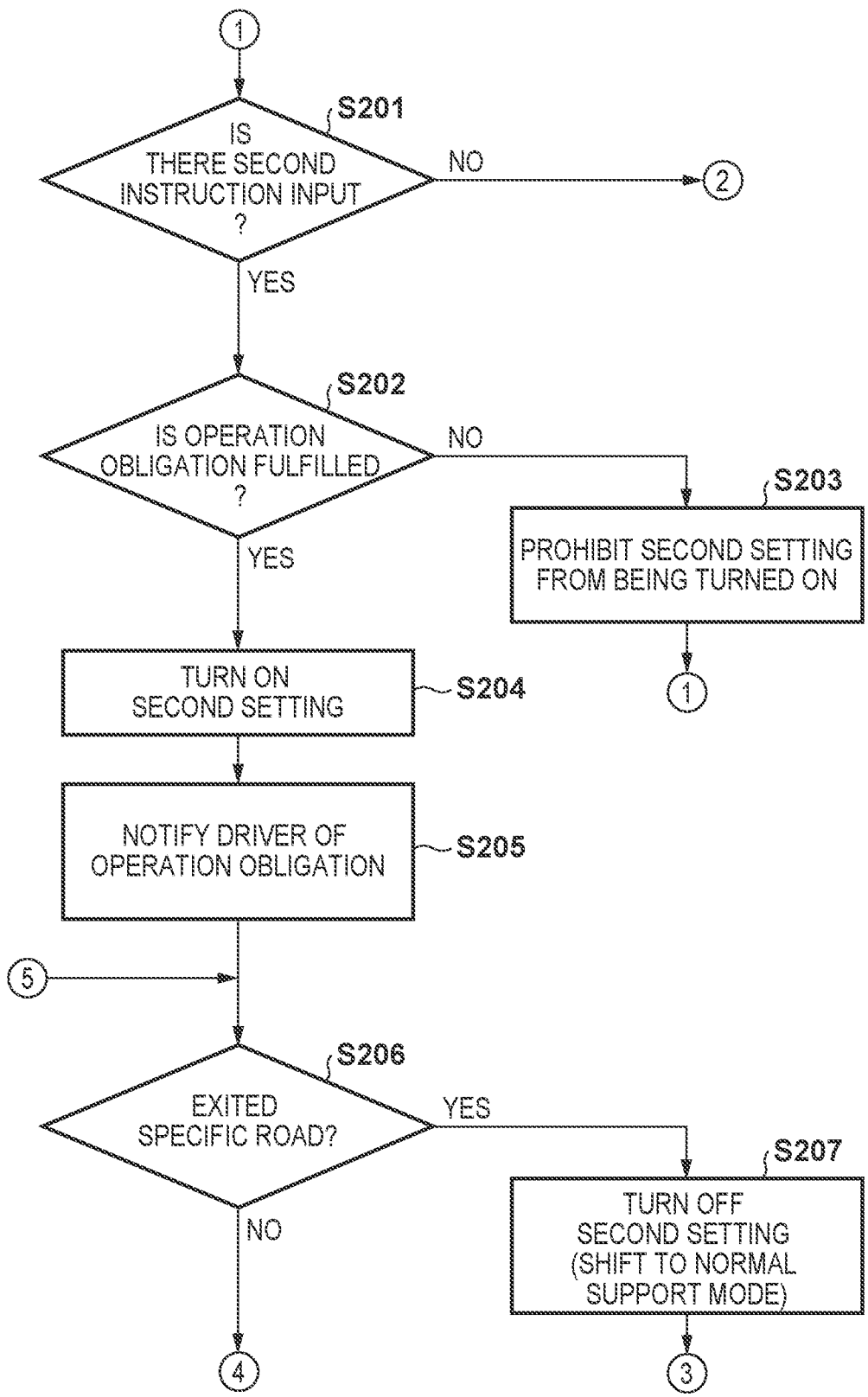
FIGS. 5A and 5B are flowcharts illustrating the driving support processing.
Figure 5B:
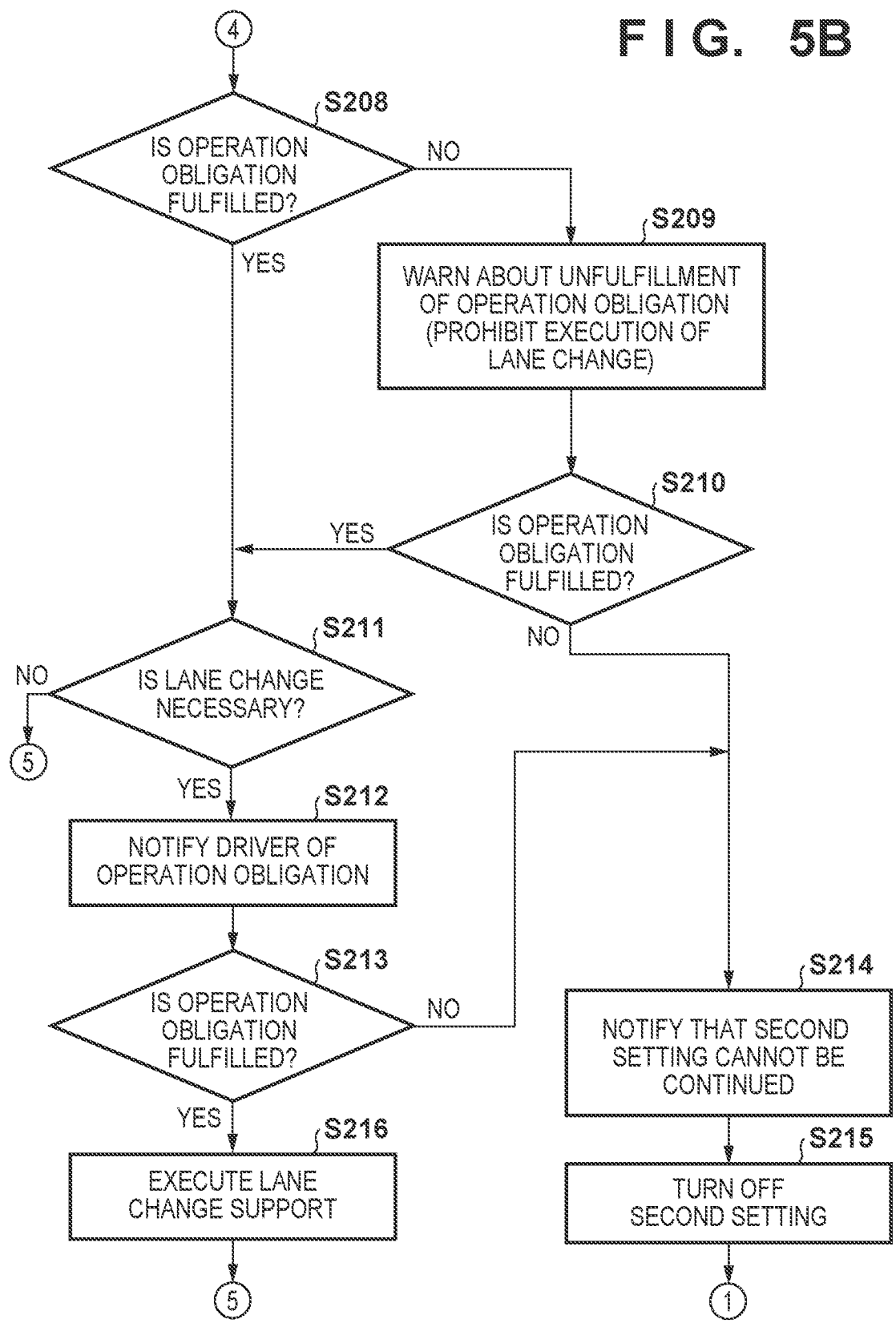
Figure 6:
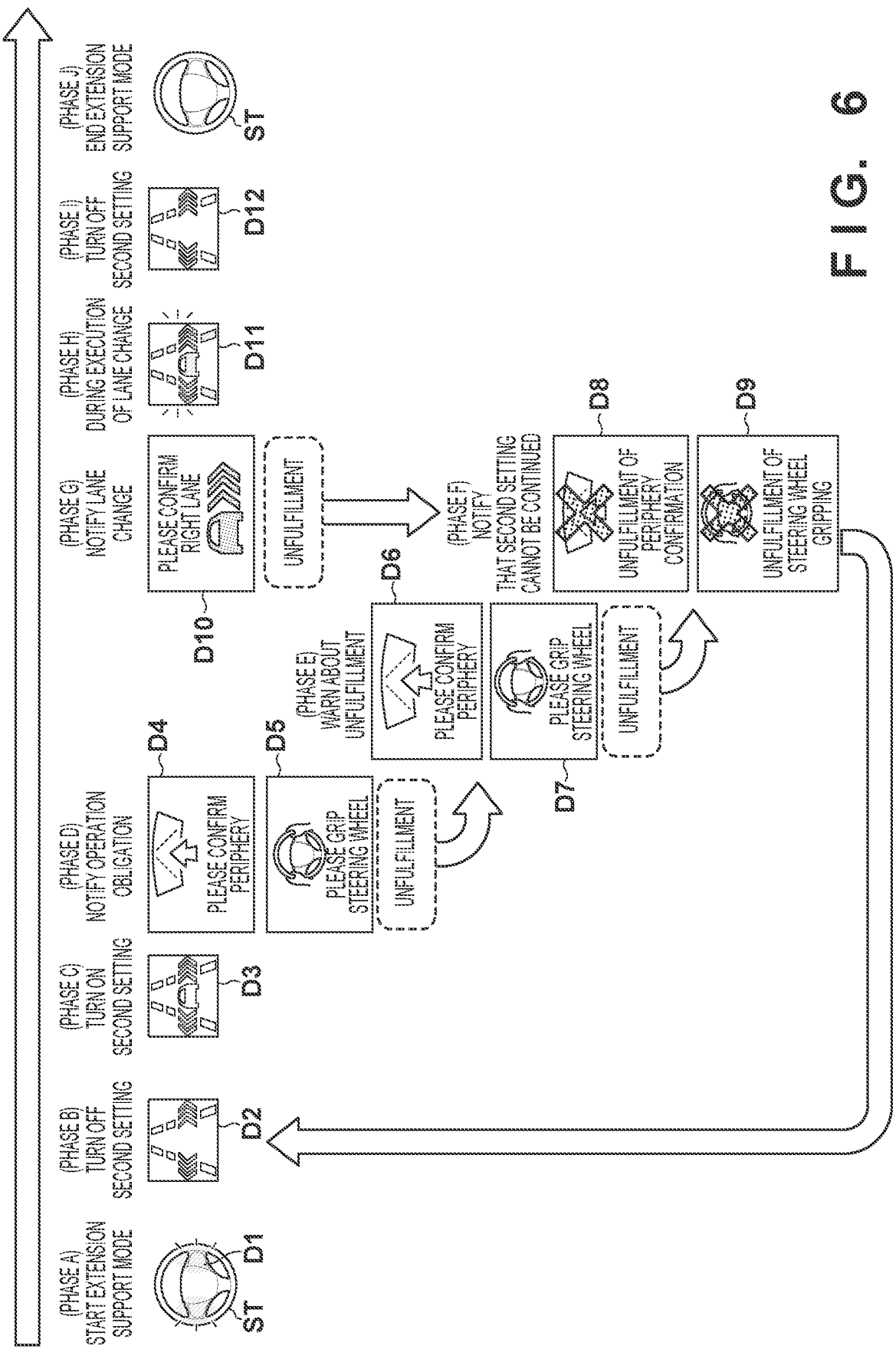
FIG. 6 is a diagram illustrating an example of transition of setting of the driving support and an operation of an information output unit in an extension support mode.

Hereinafter, driving support processing of the present embodiment will be described with reference to FIGS. 4 to 6. FIGS. 4, 5A and 5B are flowcharts illustrating the driving support processing of the present embodiment, and can be executed by the support control unit 15 when the driving support program is executed in the driving support device 10. The flowcharts of FIGS. 4, 5A and 5B are started in the manual driving mode. FIG. 6 is a diagram illustrating a transition of the setting of the driving support in the extension support mode and an operation example of the information output unit 14.

In Step S101, the support control unit 15 determines whether the reception unit 13 (switch group 6*a*) has received the first instruction input from the driver. The first instruction input is an instruction input for instructing to turn on (validate) the first setting for which the first driving support is provided. As described above, the first driving support is acceleration/deceleration support (ACC), and may further include lane keeping support (LKAS). When the first instruction input has not been received, Step S101 is repeated, and when the first instruction input has been received, the process proceeds to Step S102.

In Step S102, the support control unit 15 turns on (validates) the first setting and shifts the manual driving mode to the normal support mode (that is, the normal support mode is started). Note that the first setting can be turned off (invalidated) in response to an instruction input by the driver. For example, the support control unit 15 turns off the first setting and shifts the mode from the normal support mode to the manual driving mode when the driver's instruction input instructing turning off of the first setting is received by the reception unit 13. In this case, the flowcharts of FIGS. 4, 5A and 5B are newly started.

In Step S103, the support control unit 15 notifies the driver of the predetermined operation obligation imposed on the driver in the first setting via the information output unit 14 (for example, display device 5*a* of an instrument panel). As described above, the predetermined operation obligation includes the periphery monitoring obligation and the steering wheel gripping obligation.

In Step S104, the support control unit 15 starts monitoring the state of the driver by using the in-vehicle detection unit 12 (in-vehicle camera 9*a* and grip sensor 9*b*). The state monitoring of the driver means monitoring whether the driver fulfills a predetermined operation obligation (periphery monitoring obligation, steering wheel gripping obligation). Here, after the state monitoring of the driver is started, when it is determined that the driver does not fulfill the predetermined operation obligation from the detection result of the in-vehicle detection unit 12, the support control unit 15 may sequentially warn the unfulfillment of the operation obligation using the information output unit 14. In addition to the warning of unfulfillment of the operation obligation or instead of the warning of unfulfillment of the operation obligation, the support control unit 15 may notify the driver of the fulfillment of the predetermined operation obligation using the information output unit 14.

In Step S105, the support control unit 15 determines whether traveling on a specific road has started and highly accurate map information has been acquired by the communication device 7*c*. As described above, the specific road is a road on which highly accurate map information is provided, and examples thereof include an expressway and an automobile exclusive road. As described above, the highly accurate map information is map information including information on a detailed shape of a specific road, and hereinafter, may be simply referred to as "map information". When the map information of the specific road has not been acquired, Step S105 is repeated, and when the map information of the specific road has been acquired, the process proceeds to Step S106.

In Step S106, the support control unit 15 determines whether matching between the map information acquired in Step S105 and the image captured by the front camera 8*a* of the surrounding detection unit 11 has succeeded. When the matching is not successful, it is determined that the vehicle V is not traveling on the specific road on which the map information is provided, and the process returns to Step S105. Meanwhile, when the matching is successful, it is determined that the vehicle is traveling on the specific road, the process proceeds to Step S107, and the normal support mode is shifted to the extension support mode. As described above, in the extension support mode, the first driving support (acceleration/deceleration support, lane keeping support) linked to the map information, such as decelerating the vehicle V before the curve or before the point where the lane decreases, or adjusting the speed of the vehicle V according to the curvature of the curve, is performed. Furthermore, in the extension support mode, the second setting for providing the second driving support (system-initiated lane change (ALC)) can be turned on.

When the mode shifts to the extension support mode in Step S107, the support control unit 15 may notify the driver of the shift to the extension support mode through the information output unit 14. For example, as illustrated in a phase A of FIG. 6, the support control unit 15 can notify the driver of the shift to the extension support mode by turning on a lamp D1 provided on the steering wheel ST as the information output unit 14. In addition, the support control unit 15 can notify the driver that the first setting is turned on (validated) and the second setting is turned off (invalidated)

by displaying an image D2 as illustrated in a phase B of FIG. 6 on the display provided on the instrument panel as the information output unit 14.

In Step S108, the support control unit 15 determines whether the vehicle V has exited the specific road. For example, the support control unit 15 can determine whether the vehicle V has exited the specific road based on the current position of the vehicle V detected by the GNSS sensor 7b. Alternatively, when the map information is no longer acquired by the communication device 7c, the support control unit 15 can determine that the vehicle V has exited the specific road. When it is determined that the vehicle V has exited the specific road, the process proceeds to Step S109, and the support control unit 15 shifts the mode from the extension support mode to the normal support mode and then returns to Step S105. Meanwhile, when it is determined that the vehicle V has not exited the specific road, the process proceeds to Step S201 in FIG. 5A.

In Step S201, the support control unit 15 determines whether the reception unit 13 (switch group 6a) has received the second instruction input from the driver. The second instruction input is an instruction input for instructing the start of the second setting in which the second driving support is provided. As described above, the second driving support in this case is the system-initiated lane change support (ALC). When the second instruction input has not been received, the process returns to Step S108 in FIG. 4, and when the second instruction input has been received, the process proceeds to Step S202.

In Step S202, the support control unit 15 determines whether the driver has fulfilled the predetermined operation obligation based on the detection result of the in-vehicle detection unit 12. When it is determined that the driver has not fulfilled the predetermined operation obligation, the process proceeds to Step S203, and when it is determined that the driver has fulfilled the predetermined operation obligation, the process proceeds to Step S204.

In Step S203, the support control unit 15 prohibits the second setting from being turned on (validated). The second setting is a setting in which the second driving support (auto lane changing (ALC)) is provided, and the importance of the operation obligation (periphery monitoring obligation, steering wheel gripping obligation) imposed on the driver is higher than that in the first setting. Therefore, it is not appropriate from the viewpoint of safety to turn on the second setting when the driver does not fulfill the operation obligation, and it is preferable to limit the turning on of the second setting. Therefore, in the present embodiment, when it is determined in Step S202 that the driver has not fulfilled the predetermined operation obligation, turning on of the second setting is prohibited in Step S203. When the second setting is prohibited from being turned on, the support control unit 15 may use the information output unit 14 to issue a notification for warning the driver that the operation obligation is unfulfilled, or issue a notification for prompting the driver to fulfill the operation obligation.

Here, the support control unit 15 may prohibit the second setting from being turned on (validated) until a predetermined time elapses after it is determined in Step S202 that the driver has not fulfilled the predetermined operation obligation. The predetermined time can be set as a time required for the driver to stably fulfill the operation obligation in a case where it is assumed that the driver starts fulfilling the operation obligation by, for example, a notification for warning of unfulfillment of the operation obligation or a notification for prompting fulfillment of the operation obligation. The predetermined time can be set to 30 seconds, 1 minute, or the like based on an experimental result or the like. In addition, the support control unit 15 may prohibit the second setting from being turned on (validated) until the vehicle V travels a predetermined distance after determining that the driver has not fulfilled the predetermined operation obligation in Step S202, for example, based on the detection result of the GNSS sensor 7b. Similarly to the predetermined time, the predetermined distance can be set as a travel distance required for the driver to start fulfilling the operation obligation and stably fulfill the operation obligation by, for example, a notification for warning of unfulfillment of the operation obligation or a notification for prompting fulfillment of the operation obligation. Further, after it is determined that the driver has not fulfilled the predetermined operation obligation in Step S202, the support control unit 15 may prohibit the second setting from being turned on (validated) until it is determined that the driver has continuously fulfilled the operation obligation in the predetermined time based on the detection result of the in-vehicle detection unit 12.

In Step S204, the support control unit 15 turns on (validates) the second setting. As a result, a standby state in which the lane change support (ALC, ALCA) can be appropriately executed is brought about. In addition, the support control unit 15 notifies the driver that the second setting is turned on by displaying an image D3 as illustrated in a phase C of FIG. 6 on a display provided on the instrument panel as the information output unit 14. Note that the second setting can be turned off (invalidated) in response to an instruction input by the driver. For example, the support control unit 15 turns off the second setting when the reception unit 13 receives an instruction input from the driver to instruct to turn off the second setting. In this case, since the first setting is turned on and shifted to the extension support mode, the process returns to Step S201 of the flowchart of FIG. 5A.

In Step S205, the support control unit 15 notifies the driver of the content of the predetermined operation obligation requested to the driver in the second setting via the information output unit 14 (for example, display device 5a of an instrument panel). As described above, the predetermined operation obligation includes the periphery monitoring obligation and the steering wheel gripping obligation. For example, the support control unit 15 can notify the driver of the content of the predetermined operation obligation imposed on the driver by the second setting by displaying an image D4 and/or an image D5 as illustrated in a phase D of FIG. 6 on a display provided on an instrument panel as the information output unit 14.

In Step S206, the support control unit 15 determines whether the vehicle V has exited the specific road. Since this Step S206 is a step similar to Step S108 described above, the description thereof will be omitted here. When it is determined that the vehicle V has exited the specific road, the process proceeds to Step S207, and the support control unit 15 turns off (invalidates) the second setting, shifts the mode from the extension support mode to the normal support mode, and then returns to Step S105 in FIG. 4.

Here, when the second setting is turned off, the support control unit 15 displays an image D12 as illustrated in a phase I of FIG. 6 on a display provided on the instrument panel as the information output unit 14. As a result, it is possible to notify the driver that the second setting has been turned off. When the extension support mode is shifted to the normal support mode, the support control unit 15 turns off the lamp provided on the steering wheel ST as the information output unit 14 as illustrated in a phase J of FIG. 6. As a result, it is possible to notify the driver of the shift to the normal support mode.

In Step S208, the support control unit 15 determines whether the driver has fulfilled the predetermined operation obligation based on the detection result of the in-vehicle detection unit 12. When it is determined that the driver has not fulfilled the predetermined operation obligation, the process proceeds to Step S209, and the support control unit 15 issues a notification for warning (caution) about unfulfillment of the operation obligation and prohibits execution of a new lane change. For example, by displaying an image D6 and/or an image D7 as illustrated in a phase E of FIG. 6 on a display provided on an instrument panel as the information output unit 14, the support control unit 15 can notify the driver of a warning of unfulfillment of the operation obligation. In the example of FIG. 6, the images D6 and D7 of the phase E are the same as the images D4 and D5 of the phase D, but are not limited thereto, and may be different from the images D4 and D5 of the phase D.

After notifying the driver of a warning of unfulfillment of the operation obligation in Step S209, in Step S210, the support control unit 15 determines again whether the driver has fulfilled the predetermined operation obligation based on the detection result of the in-vehicle detection unit 12. When it is determined again that the driver has not fulfilled the operation obligation, the process proceeds to Step S214, and the support control unit 15 notifies that the second setting cannot be continued. For example, by displaying the image D8 and/or the image D9 as illustrated in the phase F of FIG. 6 on the display provided on the instrument panel as the information output unit 14, the support control unit 15 can notify the driver that the operation obligation is not fulfilled as a notification indicating that the second setting cannot be continued. Then, the support control unit 15 turns off (invalidates) the second setting in Step S215, and then returns to Step S201.

When it is determined in Step S208 or S210 that the driver has fulfilled the predetermined operation obligation, the process proceeds to Step S211. In addition, in a case where the execution of the lane change support is prohibited through Step S209, the prohibition of the execution of the lane change support is canceled when the process proceeds to Step S211. In Step S211, the support control unit 15 determines whether it is necessary to execute a lane change in order to arrive at a destination set in advance by the driver based on the map information. When it is determined that it is not necessary to execute the lane change, the process returns to Step S206, and when it is determined that it is necessary to execute the lane change, the process proceeds to Step S212.

In Step S212, the support control unit 15 notifies the driver of the content of the operation obligation required for executing the lane change determined to be necessary in Step S211. For example, when it is determined that it is necessary to change the lane to the adjacent lane in the right direction in Step S211, the support control unit 15 requests monitoring (confirmation) of the right direction of the vehicle V by displaying an image D10 as illustrated in a phase G of FIG. 6 on a display provided on an instrument panel as the information output unit 14. The same applies to a case where it is determined in Step S211 that a lane change to the adjacent lane in the left direction is necessary.

In Step S213, the support control unit 15 determines whether the driver has performed the operation obligation notified in Step S212 based on the detection result of the in-vehicle detection unit 12. When it is determined that the driver has not performed the operation obligation, the process proceeds to Step S214, and the support control unit 15 notifies that the second setting cannot be continued (for example, display of images D8 and D9 as illustrated in a phase F of FIG. 6). Then, in Step S215, the support control unit 15 turns off (invalidates) the second setting without executing the lane change support (ALC), and then returns to Step S201.

Meanwhile, when it is determined in Step S213 that the driver has performed the operation obligation, the process proceeds to Step S216, and the support control unit 15 executes the lane change support (ALC) based on the result of detection by the surrounding detection unit 11, and then returns to Step S206. During execution of the lane change support (ALC), the support control unit 15 can notify the driver that the lane change support (ALC) is being executed by displaying an image D11 as illustrated in a phase H of FIG. 6 on a display provided on an instrument panel as the information output unit 14. The image D11 of the phase H is, for example, an image in which the color of the image D3 of the phase C is changed.

[Driver-Initiated Lane Change Support (ALCA)]

Figure 7:
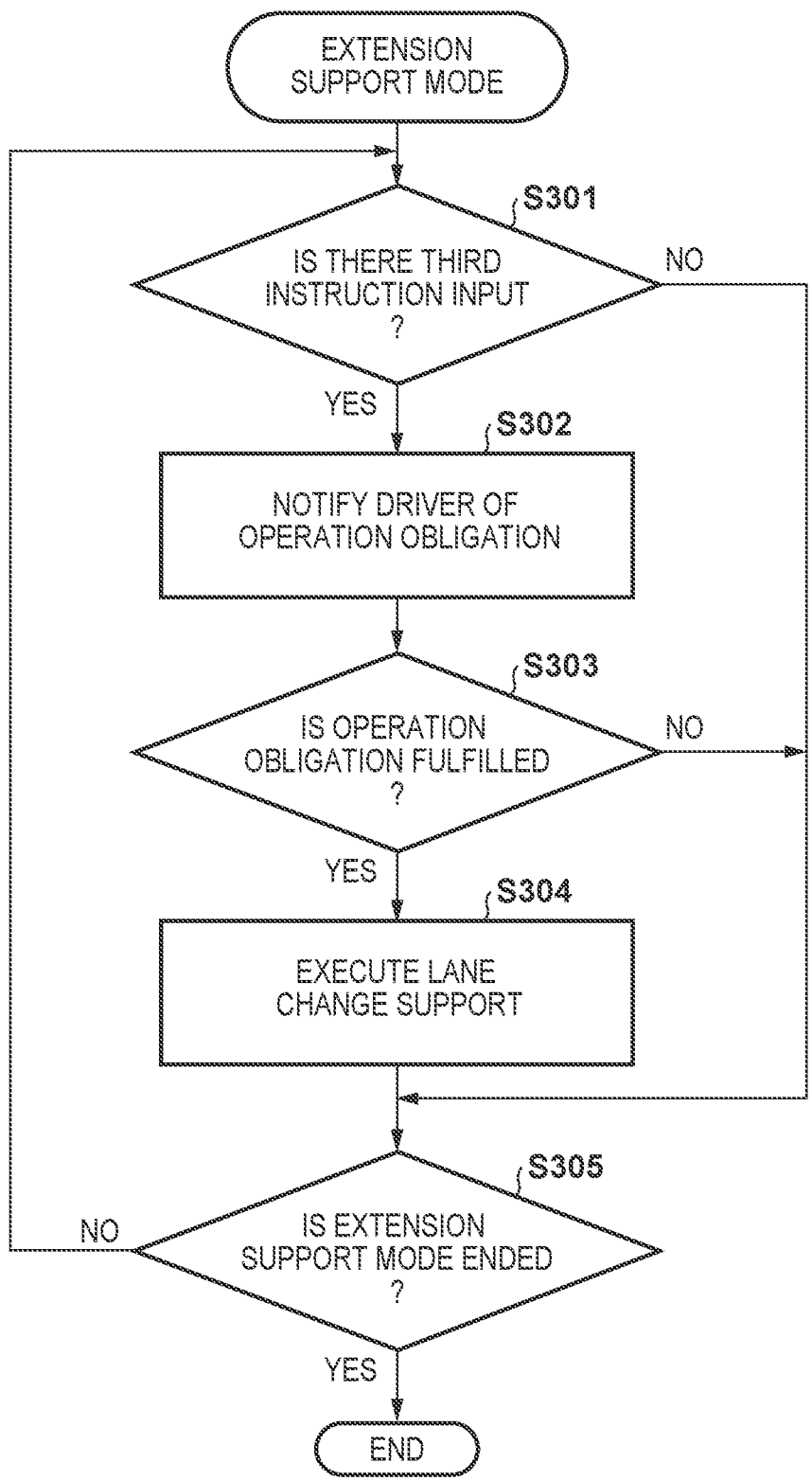
FIG. 7 is a flowchart illustrating control of driver-initiated lane change support (ALCA).

Hereinafter, one second driving support (driver-initiated lane change support (ALCA)) executed in response to reception of the third instruction input by the reception unit 13 will be described. FIG. 7 is a flowchart illustrating control of the driver-initiated lane change support (ALCA). The driver-initiated lane change support (ALCA) is executable when the first driving support based on the map information is provided during the first setting (that is, in the extension support mode), and is started, for example, when the mode shifts to the extension support mode in Step S107 in FIG. 4. The flowchart of FIG. 7 can be executed by the support control unit 15 in parallel with the flowcharts of FIGS. 4, 5A and 5B when the driving support program is executed in the driving support device 10.

In Step S301, the support control unit 15 determines whether the reception unit 13 (direction indicator lever 6*b*) has received the third instruction input from the driver. The third instruction input is an instruction input for instructing execution of the driver-initiated lane change support (ALCA) as one second driving support, and includes an instruction input of a lane change direction (hereinafter, it may be referred to as an instruction direction) instructed by the driver by the operation of the direction indicator lever 6*b*. When the third instruction input has not been received, the process proceeds to Step S305, and when the third instruction input has been received, the process proceeds to Step S302. In the present embodiment, the example in which the third instruction input is performed by the operation of the direction indicator lever 6*b* has been described, but the third instruction input may be performed by the operation of the switch group 6*a*. Also in this case, the third instruction input may be performed by an operation different from the first instruction input and/or the second instruction input.

In Step S302, the support control unit 15 notifies the driver of the operation obligation required for executing the lane change to the adjacent lane in the instruction direction received as the third instruction input in Step S301. For example, when a lane change to the adjacent lane in the right direction is instructed as the instruction direction, the support control unit 15 requests monitoring (confirmation) of the right direction of the vehicle V by displaying the image D10 as illustrated in the phase G of FIG. 6 on a display provided on an instrument panel as the information output unit 14. The same applies to a case where a lane change to the adjacent lane in the left direction is instructed as the instruction direction.

In Step S303, the support control unit 15 determines whether the driver has performed the operation obligation notified in Step S302 based on the detection result of the in-vehicle detection unit 12. When it is determined that the driver has not performed the operation obligation, the process proceeds to Step S305 without executing the lane change support (ALCA). Meanwhile, when it is determined that the driver has performed the operation obligation, the process proceeds to Step S304. In Step S304, the support control unit 15 executes lane change support (ALCA) based on the result of detection by the surrounding detection unit 11.

In Step S305, the support control unit 15 determines whether the extension support mode has ended. For example, the support control unit 15 can determine that the extension support mode has ended when the vehicle V exits the specific road or when the reception unit 13 receives an instruction input for instructing OFF (invalidation) of the first setting. When it is determined that the extension support mode has not ended, the process returns to Step S301, and when it is determined that the extension support mode has ended, the flowchart of FIG. 7 ends.

As described above, in a state in which the second setting in which the system-initiated lane change support (ALC) as the second driving support is provided is turned on (validated), the driving support device 10 of the present embodiment turns off (invalidates) the second setting when it is determined that the driver has not performed the predetermined operation obligation. In addition, in a state in which the first setting is validated and the second setting can be turned on, the driving support device 10 prohibits the second setting from being turned on (validated) when it is determined that the driver has not performed the predetermined operation obligation. As a result, the driving support for the lane change (auto lane changing) is appropriately executed, and the safety of the vehicle V can be improved.

Other Embodiments

The driving support program described in the above embodiment is supplied to the driving support device 10 via a network or a storage medium, and a computer (for example, one or more processors constituting the support control unit 15) of the driving support device 10 can read and execute the program. The present invention can also be realized by such an aspect.

Summary of Embodiments

1. A driving support device of the above-described embodiment is a driving support device (e.g. 10) that performs driving support of a vehicle (e.g. V), the driving support device comprising:
a detector (e.g. 9a-9b, 12) configured to detect a state of a driver of the vehicle; and
a controller (e.g. 1, 15) configured to control the driving support with a setting validated by the driver among a plurality of settings including a first setting and a second setting each of which requests the driver to perform a predetermined operation obligation,
wherein the first setting is a setting in which first driving support (e.g. ACC, LKAS) for supporting traveling of the vehicle in a traveling lane in which the vehicle travels is provided,
wherein the second setting is a setting in which second driving support (e.g. ALC) for supporting a lane change of the vehicle from the traveling lane to an adjacent lane is provided, and is validated in a state where the first setting is validated, and
wherein the controller is configured to invalidate the second setting, in a case of determining that the driver does not fulfill the operation obligation from a detection result of the detector in a state where the second setting is validated.

According to this configuration, the second driving support (ALC) is appropriately executed according to whether the driver has performed the predetermined operation obligation required of the driver, so that the safety of the vehicle V can be improved.

2. In the above-described embodiment,
in a state where the second setting is validated, the controller is configured to:
in a case of determining that the driver does not fulfill the operation obligation from the detection result of the detector, notify the driver of a warning that the driver does not fulfill the operation obligation, and
in a case of determining again that the driver does not fulfill the operation obligation from the detection result of the detector even after notifying the driver of the warning, invalidate the second setting.

According to this configuration, even in a case where the driver does not temporarily perform the predetermined operation obligation, an opportunity (relief) to fulfill the operation obligation is given to the driver. Therefore, the second driving support (ALC) is appropriately performed, and it can be advantageous in terms of convenience.

3. In the above-described embodiment,
the controller is configured to notify the driver that the second setting is to be invalidated, in a case of invalidating the second setting.

According to this configuration, the driver can grasp the invalidation of the second setting, which can be advantageous in terms of convenience.

4. In the above-described embodiment,
the controller is configured to prohibit the validation of the second setting, in a case of determining that the driver does not fulfill the operation obligation from a detection result of the detector in a state where the first setting is validated and the second setting is invalidated.

According to this configuration, the second driving support (ALC) is appropriately executed according to whether the driver has performed the predetermined operation obligation required of the driver, so that the safety of the vehicle V can be improved.

5. A driving support device of the above-described embodiment is a driving support device (e.g. 10) that performs driving support of a vehicle (e.g. V), the driving support device comprising:
a detector (e.g. 9a-9b, 12) configured to detect a state of a driver of the vehicle; and
a controller (e.g. 1, 15) configured to control the driving support with a setting validated by the driver among a plurality of settings including a first setting and a second setting each of which requests the driver to perform a predetermined operation obligation,
wherein the first setting is a setting in which first driving support (e.g. ACC, LKAS) for supporting traveling of the vehicle in a traveling lane in which the vehicle travels is provided, wherein the second setting is a setting in which second driving support (e.g. ALC) for supporting a lane change of the vehicle from the traveling lane to an adjacent lane is provided, and is validated in a state where the first setting is validated, and wherein the controller is configured to prohibit the validation of the second setting, in a case of determining that the driver does not fulfill the operation obligation from a detection result of the detector in a state where the first setting is validated.

According to this configuration, the second driving support (ALC) is appropriately executed according to whether the driver has performed the predetermined operation obligation required of the driver, so that the safety of the vehicle V can be improved.

6. In the above-described embodiment,
the controller is configured to prohibit the validation of the second setting until a predetermined time elapses after determining that the driver does not fulfill the operation obligation.

According to this configuration, when the driver does not perform the predetermined operation obligation, a penalty of prohibiting the validation of the second setting is given to the driver, whereby the driver can be made to recognize the importance of the predetermined operation obligation.

7. In the above-described embodiment,
the controller is configured to prohibit the validation of the second setting until the vehicle travels a predetermined distance after determining that the driver does not fulfill the operation obligation.

According to this configuration, when the driver does not perform the predetermined operation obligation, a penalty of prohibiting the validation of the second setting is given to the driver, whereby the driver can be made to recognize the importance of the predetermined operation obligation.

8. In the above-described embodiment,
after determining that the driver does not perform the operation obligation, the controller is configured to prohibit the validation of the second setting until determining that the driver continuously performs the operation obligation in a predetermined time based on a detection result of the detector.

According to this configuration, when the driver does not perform the predetermined operation obligation, a penalty of prohibiting the validation of the second setting is given to the driver, whereby the driver can be made to recognize the importance of the predetermined operation obligation.

9. In the above-described embodiment,
the second setting is validated in a case where the first driving support based on map information is provided in a state where the first setting is validated, and
the map information includes information on a shape of a road on which the vehicle travels.

According to this configuration, the second driving support (ALC) with the second setting can be appropriately executed based on the map information.

10. In the above-described embodiment,
the controller is configured to invalidate the second setting in a case where providing the first driving support based on the map information ends.

According to this configuration, the second driving support (ALC) with the second setting can be appropriately executed based on the map information.

11. In the above-described embodiment,
the driving support device further comprises a reception unit (e.g. 5a-5b, 13) configured to receive an instruction input from the driver, the first setting is validated in response to reception of a first instruction input from the driver by the reception unit, and the second setting is validated in response to reception of a second instruction input of the driver by the reception unit in a state where the first setting is validated.

According to this configuration, it is possible to validate each of the first setting and the second setting in response to the reception of the instruction input of the driver.

12. In the above-described embodiment,
in a case where the second setting is validated in response to the reception of the second instruction input by the reception unit, the controller is configured to notify the driver of a content of the operation obligation to be requested to the driver in the second setting.

According to this configuration, since the driver can grasp the predetermined operation obligation required in the second setting, the driver can appropriately perform the predetermined operation obligation.

13. In the above-described embodiment,
the controller is configured to execute the second driving support once in response to reception of a third instruction input by the driver by the reception unit in a state where the first setting is validated, and
the third instruction input is performed by an operation different from the second instruction input.

According to this configuration, the driver-initiated second driving support (ALCA) can be provided.

14. In the above-described embodiment,
in a case where the first driving support based on the map information is provided in a state where the first setting is validated, the controller is configured to execute the second driving support once in response to reception of the third instruction input by the reception unit, and
the map information includes information on a shape of a road on which the vehicle travels.

According to this configuration, the driver-initiated second driving support (ALCA) can be appropriately executed based on the map information.

15. In the above-described embodiment,
the reception unit receives, as the third instruction input, an input in a direction in which the driver requests the lane change, and
the controller is configured to control the second driving support so as to change the lane to an adjacent lane in the direction received by the reception unit.

According to this configuration, the driver-initiated second driving support (ALCA) can be appropriately executed in a direction desired by the driver.

16. In the above-described embodiment,
in a state where the second setting is validated, the controller is configured to execute, in a case of determining that the lane change is necessary, the second driving support even without the third instruction input.

According to this configuration, in a state where the second setting is validated, the system-initiated second driving support (ALCA) led can be appropriately performed separately from the driver-initiated second driving support (ALC).

The invention is not limited to the foregoing embodiments, and various variations/changes are possible within the spirit of the invention.

What is claimed is:

1. A driving support device that performs driving support of a vehicle, the driving support device comprising:
a detector configured to detect a state of a driver of the vehicle; and a controller configured to control the driving support with a setting validated by the driver among a plurality of settings including a first setting and a second setting each of which requests the driver to perform a predetermined operation obligation, wherein the first setting is a setting in which a first driving support for supporting traveling of the vehicle in a traveling lane in which the vehicle travels is provided, wherein the second setting is a setting in which a second driving support for supporting a lane change of the vehicle from the traveling lane to an adjacent lane is provided, and is validated in response to reception of an instruction input in a state where the first setting is validated, and wherein the controller is configured to return to the first setting before the reception of the instruction input by invalidating the second setting, in a case of determining that the driver does not fulfill the operation obligation from a detection result of the detector in a state where the second setting is validated.

2. The driving support device according to claim 1, wherein in a state where the second setting is validated, the controller is configured to:
in a case of determining that the driver does not fulfill the operation obligation from the detection result of the detector, notify the driver of a warning that the driver does not fulfill the operation obligation, and
in a case of determining again that the driver does not fulfill the operation obligation from the detection result of the detector even after notifying the driver of the warning, invalidate the second setting.

3. The driving support device according to claim 1, wherein the controller is configured to notify the driver that the second setting is to be invalidated, in a case of invalidating the second setting.

4. The driving support device according to claim 1, wherein the controller is configured to prohibit the validation of the second setting, in a case of determining that the driver does not fulfill the operation obligation from a detection result of the detector in a state where the first setting is validated and the second setting is invalidated.

5. The driving support device according to claim 1, wherein the controller is configured to prohibit the validation of the second setting until a predetermined time elapses after determining that the driver does not fulfill the operation obligation.

6. The driving support device according to claim 1, wherein the controller is configured to prohibit the validation of the second setting until the vehicle travels a predetermined distance after determining that the driver does not fulfill the operation obligation.

7. The driving support device according to claim 1, wherein after determining that the driver does not perform the operation obligation, the controller is configured to prohibit the validation of the second setting until determining that the driver continuously performs the operation obligation in a predetermined time based on a detection result of the detector.

8. The driving support device according to claim 1, wherein
the second setting is validated in a case where the first driving support based on map information is provided in a state where the first setting is validated, and
the map information includes information on a shape of a road on which the vehicle travels.

9. The driving support device according to claim 8, wherein the controller is configured to invalidate the second setting in a case where providing the first driving support based on the map information ends.

10. The driving support device according to claim 1, further comprising a reception unit configured to receive an instruction input from the driver,
wherein the first setting is validated in response to reception of a first instruction input from the driver by the reception unit, and
wherein the second setting is validated in response to reception of a second instruction input of the driver by the reception unit in a state where the first setting is validated.

11. The driving support device according to claim 10, wherein in a case where the second setting is validated in response to the reception of the second instruction input by the reception unit, the controller is configured to notify the driver of a content of the operation obligation to be requested to the driver in the second setting.

12. The driving support device according to claim 10, wherein
the controller is configured to execute the second driving support once in response to reception of a third instruction input by the driver by the reception unit in a state where the first setting is validated, and
the third instruction input is performed by an operation different from the second instruction input.

13. The driving support device according to claim 12, wherein
in a case where the first driving support based on the map information is provided in a state where the first setting is validated, the controller is configured to execute the second driving support once in response to reception of the third instruction input by the reception unit, and
the map information includes information on a shape of a road on which the vehicle travels.

14. The driving support device according to claim 12, wherein
the reception unit receives, as the third instruction input, an input in a direction in which the driver requests the lane change, and
the controller is configured to control the second driving support so as to change the lane to an adjacent lane in the direction received by the reception unit.

15. The driving support device according to claim 12, wherein in a state where the second setting is validated, the controller is configured to execute, in a case of determining that the lane change is necessary, the second driving support even without the third instruction input.

16. A vehicle comprising the driving support device according to claim 1.

17. A driving support device that performs driving support of a vehicle, the driving support device comprising:
a detector configured to detect a state of a driver of the vehicle; and
a controller configured to control the driving support with a setting validated by the driver among a plurality of settings including a first setting and a second setting each of which requests the driver to perform a predetermined operation obligation,
wherein the first setting is a setting in which a first driving support for supporting traveling of the vehicle in a traveling lane in which the vehicle travels is provided,
wherein the second setting is a setting in which a second driving support for supporting a lane change of the vehicle from the traveling lane to an adjacent lane is provided, and is validated in a state where the first setting is validated, and wherein in a case of determining that the driver does not fulfill the operation obligation from a detection result of the detector in a state where the first setting is validated, the controller is configured to prohibit the validation of the second setting until a predetermined time elapses after determining that the driver does not fulfill the operation obligation and/or until the vehicle travels a predetermined distance after determining that the driver does not fulfill the operation obligation.

18. A vehicle comprising the driving support device according to claim 17.

19. A driving support method for performing driving support of a vehicle, the method comprising:
   detecting a state of a driver of the vehicle; and
   controlling the driving support with a setting validated by the driver among a plurality of settings including a first setting and a second setting each of which requires the driver to perform a predetermined operation obligation,
   wherein the first setting is a setting in which first driving support for supporting traveling of the vehicle in a traveling lane in which the vehicle travels is provided,
   wherein the second setting is a setting in which second driving support for supporting a lane change of the vehicle from the traveling lane to an adjacent lane is provided, and is validated in response to reception of an instruction input in a state where the first setting is validated, and
   wherein in the controlling the driving support, the second setting is invalidated and returned to the first setting before the reception of the instruction input, in a case of determining that the driver does not fulfill the operation obligation from a detection result in the detecting in a state where the second setting is validated.

20. A non-transitory computer-readable storage medium storing a program for causing a computer to execute a driving support method according to claim 19.

21. A driving support method for performing driving support of a vehicle, the method comprising:
   detecting a state of a driver of the vehicle; and
   controlling the driving support with a setting validated by the driver among a plurality of settings including a first setting and a second setting each of which requires the driver to perform a predetermined operation obligation,
   wherein the first setting is a setting in which first driving support for supporting traveling of the vehicle in a traveling lane in which the vehicle travels is provided,
   wherein the second setting is a setting in which second driving support for supporting a lane change of the vehicle from the traveling lane to an adjacent lane is provided, and is validated in a state where the first setting is validated, and
   wherein in a case of determining that the driver does not fulfill the operation obligation from a detection result in the detecting in a state where the first setting is validated, the controlling the driving support includes prohibiting the validation of the second setting until a predetermined time elapses after determining that the driver does not fulfill the operation obligation and/or until the vehicle travels a predetermined distance after determining that the driver does not fulfill the operation obligation.

22. A non-transitory computer-readable storage medium storing a program for causing a computer to execute a driving support method according to claim 21.

* * * * *